April 6, 1943.  H. J. SAUER  2,316,023

TIRE REMOVING TOOL

Filed July 23, 1941  2 Sheets-Sheet 1

INVENTOR.
HENRY JOHN SAUER
BY Edward C. Healy
ATTORNEY.

April 6, 1943.   H. J. SAUER   2,316,023
TIRE REMOVING TOOL
Filed July 23, 1941   2 Sheets-Sheet 2
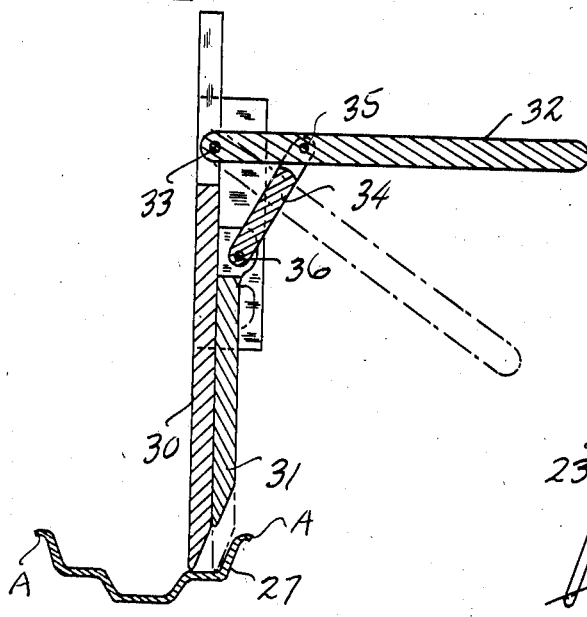
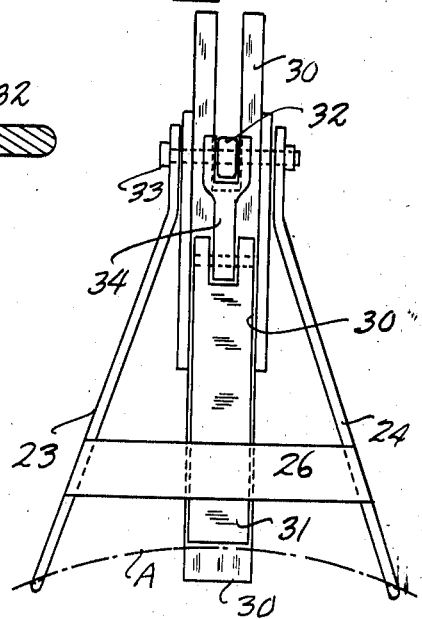
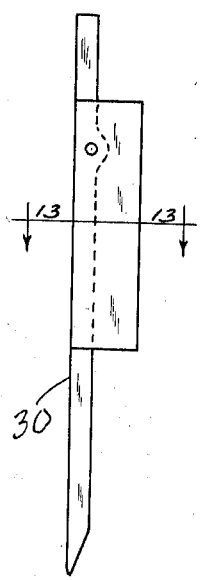
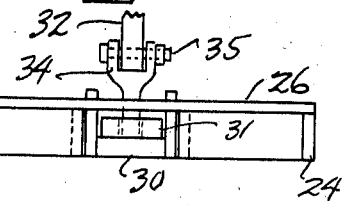
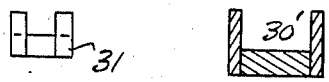
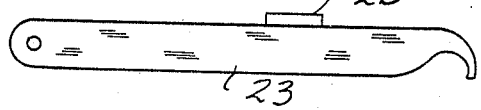
INVENTOR.
HENRY JOHN SAUER
BY Edward C. Healy
ATTORNEY.

Patented Apr. 6, 1943

2,316,023

UNITED STATES PATENT OFFICE 2,316,023

TIRE REMOVING TOOL

Henry John Sauer, Oakland, Calif.

Application July 23, 1941, Serial No. 403,684

1 Claim. (Cl. 157—6)

This invention relates to improvements in tire removing tools that are used for removing pneumatic tires from the wheels of automobiles and other automotive vehicles.

An object of the invention is to provide a new and improved tire removing tool that will positively prevent the tire from being damaged while it is being removed from the wheel.

Another object of the invention is to provide a tool of the character described that will enable the removing of tires from their wheels in an expeditious and efficient manner.

Another object of the invention is to provide a tool of the character described with a tire protecting plate for receiving therein the frictional pressure that is exerted against the side wall and bead of the tire when said tire is being removed from the wheel, thereby preventing the side wall and bead from being damaged in any way during the removing operation.

Another object of the invention is to provide a tire protecting plate and a bifurcated cam acting implement that is adapted to cooperate with said plate for removing the tire.

A further object of the invention is the provision of means for hooking the device to the rim of the wheel when the tire is being removed.

The invention further consists in the particular combination, construction and association of the different parts, such as described in the following specification, and possesses various other objects and features of advantage, some of which, with the foregoing, will be made manifest in the drawings accompanying and forming part of this specification.

In the accompanying drawings wherein there is illustrated a preferred form of the invention:

Fig. 7 is a vertical central longitudinal sectional view of a modified form of the invention;

Fig. 8 is a plan view of the same;

Fig. 9 is a side elevational view of the tire protecting plate shown in Fig. 7;

Fig. 10 is a side elevational view of a wedging plate that is used in combination with the tire protecting plate;

Fig. 11 is a lower end elevation of the view shown in Fig. 8;

Fig. 12 is an upper end elevation of the view shown in Fig. 10;

Fig. 13 is an end sectional view taken on the line 13—13 of Fig. 9, looking in the direction of the arrows; and Fig. 14 is a side elevational view of a hooking means that is provided to hook the device to the rim of the wheel when the tire is being removed.

Figure 1:
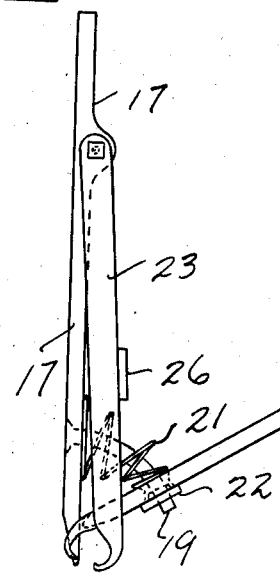
Fig. 1 is a side elevational view of a preferred form of device involving the present invention.
Figure 2:
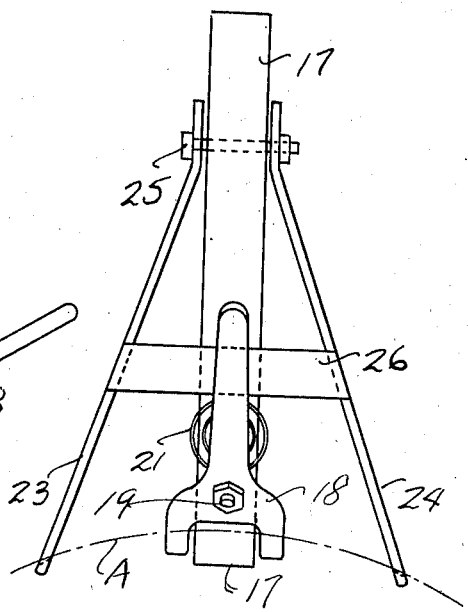
Fig. 2 is a plan view of the same.
Figure 3:
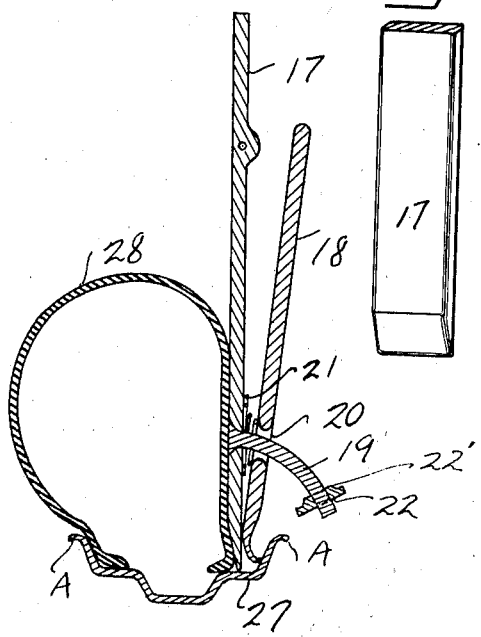
Fig. 3 is a vertical central longitudinal sectional view of the device and also shows an end sectional view of an automobile tire on a wheel rim, illustrating the step of removing the tire bead from its seat.
Figure 4:
Fig. 4 is a perspective fragmentary view of the tire protecting plate used in the invention.
Figure 5:
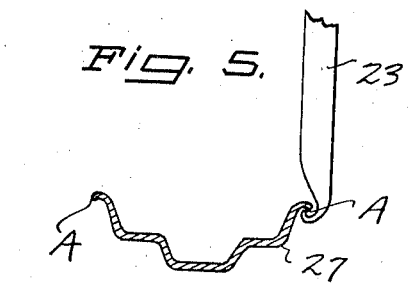
Fig. 5 is a view, illustrating the method of hooking the device to the rim edge A of the wheel when the tire is being removed.
Figure 6:
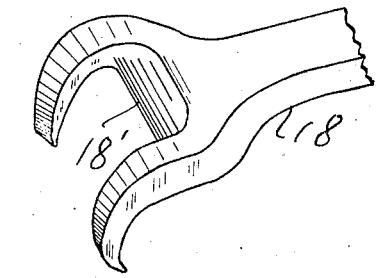
Fig. 6 is a perspective fragmentary view of a cam acting bifurcated implement used in the invention.

Referring in detail to the different parts of the invention, the numeral 17 designates the tire protecting plate, and the numeral 18 a bifurcated cam acting implement that is adapted to cooperate with said plate to remove the tire. The lower end portion of the plate 17 is made wedge-shaped to enable the same to be easily inserted between the side of the tire and the edge of the rim of the wheel; and all corners of the plate are slightly rounded to eliminate all sharp edges. The bifurcated implement 18 is capable of straddling the plate 17, as shown in Fig. 2, and the lower end portion thereof is curved into any suitable form to render the proper cam action against the plate 17 so that the tire may be efficiently removed. A downwardly curved arm 19 is fixed into the lower portion of the plate 17 and projects through the bifurcated handle portion of the implement, as shown in Fig. 3. It will be noted that the opening 20 in said handle is made sufficiently large to allow for free and easy movement of the bifurcated implement. A tapered coil spring 21 is provided between the implement 18 and the plate 17 and is adapted to resiliently move said implement to its outer position, as shown in Fig. 1. A nut 22, having a tapered portion 22 that is adapted to extend into the opening 20 of the bifurcated implement 18, is fixed on the outer end portion of the arm 19 to hold said implement in its outermost position.

It is often desirable to hook the device onto the rim of the wheel when removing a tire. Suitable means is, therefore, provided, which consists of a pair of hook-shaped arms 23 and 24, said arms being pivotally connected to the tire protecting plate 17, as shown in Figs. 1 and 2, a suitable bolt and nut 25 being used for connecting the elements together. The said arms 23 and 24 are made into any suitable length and are preferably fastened together by a crossbar 26 that is substantially fixed thereto by being welded, or may be fixed in any other suitable manner, and is located as illustrated or may extend across the extreme outermost ends, if desired.

As hereinbefore stated, an object of the invention is to eliminate all possibility of damaging a tire when removing the same. In Fig. 3 there is illustrated a view showing the position of the elements when the tire is being removed. The tire is designated by the numeral 27, and the rim of the wheel by the numeral 28. When it is desired to remove a tire, the plate 17 is inserted between the lower outer wall of the tire and the edge of the rim. It is to be noted that no great pressure that would damage the tire in the slightest manner is required to insert the plate 17 as stated, but heavy pressure will be required to force the bead of the tire into the center portion of the rim of the wheel. After the plate 17 has been placed between the side of the tire and the edge of the rim of the wheel, the bifurcated implement 18 is positioned, as shown in Fig. 1; and when it is desired to move the bead of the tire inwardly, said implement is brought to the position as shown in Fig. 3. A cam action is thus produced by the curved portion 18' of the bifurcated implement against the plate 17 that will force said plate and tire wall toward the central portion of the rim of the wheel, which will enable the tire to be removed from the wheel. It will be particularly observed that said cam action with its heavy sliding frictional pressure is exerted against the plate 17 and not against any portion of the tire, said plate thus protecting the tire and preventing the same from becoming damaged during the removing operation.

In Fig. 7 there is illustrated a modified form of the invention comprising a tire protecting plate 30, similar to the one hereinbefore mentioned and also including an auxiliary wedge-shaped plate 31 that is provided to force the plate 30 against the tire. A handle 32 is pivoted to the plate 30 by a bolt 33, said handle carrying a link arm 34 that is pivoted thereto by a bolt 35 and also pivoted to the upper end of the auxiliary plate 31 by a pin 36, as shown in Fig. 7. The upper ends of the plates 30 and 31 are preferably slotted, and the link arm 34 is preferably Y-shaped, as illustrated. The plate 30 is provided with a guideway 30', as shown in Figs. 8 and 13, to guide the auxiliary plate 31. When it is desired to remove a tire, the plate 30 is inserted between the side wall of the tire and the edge of the rim of the wheel, and the handle 32 is moved downwardly, which will force the plate 31 against the edge of the rim of the wheel, as shown by the dot-and-dash outline in Fig. 7, and will force the tire protecting plate 30 toward the central portion of the rim of the wheel, thus enabling the tire to be removed.

It is to be understood that the forms of my invention herewith shown and described are to be taken as preferred examples of the same and that various changes relative to the material, size, shape and arrangement of parts may be resorted to provided said changes come within the scope of the claim.

Having thus described my invention, I claim:

A tire removing device of the character described having in combination an oblong wedge-shaped plate capable of being inserted between the outer side wall of the tire and the inner edge of the rim of the wheel that carries the tire, the corners of said plate being rounded, means for hooking said plate to the rim of the wheel that carries the tire, an arm fixed into the lower portion of the plate and curving downwardly therefrom, a bifurcated implement capable of straddling said plate loosely mounted on said curved arm and capable of having reciprocative movement thereon, a tapered coiled spring mounted on said arm and arranged between said plate and said bifurcated implement, and means on the outer end of asid arm for limiting the outer movement of the bifurcated implement, a portion of the bifurcated implement being capable of producing a cam action against the plate to remove the bead from its seat.

HENRY JOHN SAUER.